March 4, 1924.
J. P. CARMINE
FOCUSING DEVICE FOR HAND CAMERAS
Filed May 21, 1923
1,485,481
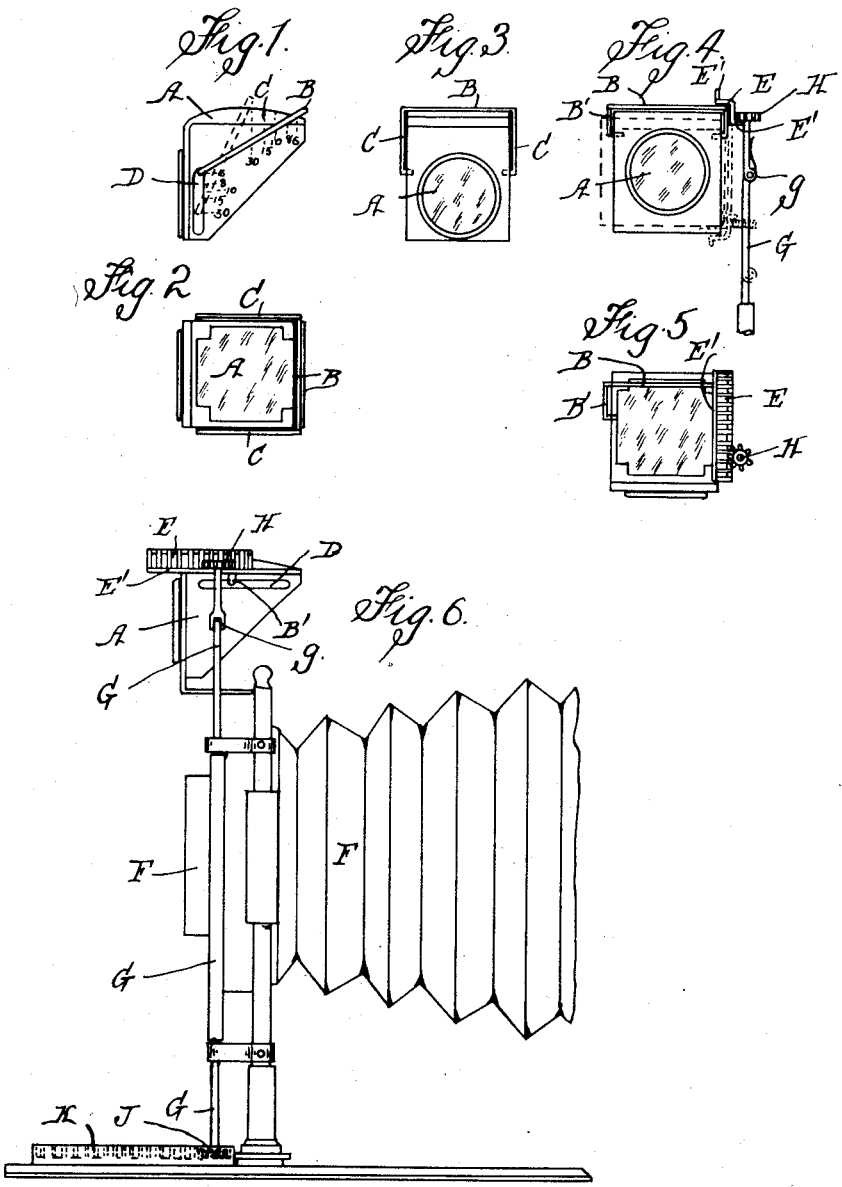
Inventor:
Joseph Patrick Carmin Patented Mar. 4, 1924.

1,485,481

UNITED STATES PATENT OFFICE.

JOSEPH PATRICK CARMINE, OF WESTPORT, NEW ZEALAND.

FOCUSING DEVICE FOR HAND CAMERAS.

Application filed May 21, 1923. Serial No. 640,442.

*To all whom it may concern:*

Be it known that I, JOSEPH PATRICK CARMINE, subject of the King of Great Britain, residing at Palmerston Street, Westport, Dominion of New Zealand, have invented a new and useful Improved Focusing Device for Hand Cameras, of which the following is a specification.

This invention relates to hand cameras of any of the ordinary types in which the focusing of the camera is effected by the movement of the lens in relation to the exposure film or plate.

In order to obtain proper results in the use of such a camera it is required that the distance of the subject must be measured or gauged, especially when such distance is at anything less than the "infinity" focus for which the camera is set, and the camera then adjusted to the correct focus for such distance. These operations are generally tedious to carry out and are such that mistakes are likely to be made, with the consequence that poor pictures result.

The present invention has been devised with the object of providing means upon such a form of camera, and more especially upon the view finder with which the camera is fitted, whether such finder is disposed horizontally or vertically, whereby the correct distance away of the subject may be ascertained by viewing the subject in the view finder and adjusting a movable part on the finder to the foot of the subject's reflection as shown in the finder. The invention in its principle of working is based upon the fact that when the camera is held parallel with the ground at or about a fixed height therefrom, the bottom of a subject at varying distances away will appear in the view finder at different points in the vertical line of the finder's vision. Consequently if an indicator is mounted on the finder to move over the finder in the line of the subject's height viewed thereon, it will at the different positions, correspond with the bottoms of subjects at different fixed distances away.

This principle is appropriated in the carrying out of this invention, which consists broadly in the combination with the view finder of an indicator bar mounted thereon to extend laterally over the vision glass of the top thereof and adapted to be moved to and fro while maintaining its correct lateral line across the vertical line of the vision in the finder. This indicator bar may be moved in relation to a scale of distances marked upon the finder and arbitrarily fixed to correspond with the distances of the subjects, with the feet of the images of which the bar coincides when in its relative positions.

Consequently in the use of the apparatus, the distance away of a subject may be ascertained by the viewing thereof in the view finder with the camera held parallel with the ground at its proper height, and the moving of the indicator bar to the foot of the image shown in the finder, and then the reading of the scale indicator with which the bar then registers. The distance being thus ascertained, the camera may be focused correspondingly upon its ordinary focusing scale, and the correct focus thus obtained.

This arrangement is entirely manual and is the simplest form of the invention, but the invention may be carried out in such a way as to provide for the indicator bar being moved automatically by the movement of the camera lens, as it is drawn out to its different focal positions, so that the correct focusing of the camera may be automatically obtained merely by observing the subject in the view finder and moving the camera lens out until the indicator bar is moved on the view finder to the foot of the image shown therein, the camera of course being held parallel with the ground and at its proper height. This automatic movement of the indicator bar is designed only to commence after the camera lens passes out from the "infinity" to the closer focal distances.

The manner of carrying out the invention as to its details of construction, both in the non-automatic and automatic forms, may be varied in a large number of ways without departing from its principle of construction and operation. These ways will necessarily vary also with the different makes of cameras of this type that exist, and must be adapted to suit the different constructions of view finders employed thereon. They must also be so formed as not to interfere with the folding of the camera, or the turning of the view finder on its own axis to enable the camera being used either vertically or on its side, as is now provided for.

In the accompanying drawings, suitable ways of carrying out the invention are shown, but these are merely to illustrate its general principles of construction and operation.

In these drawings:—

Figure 1 is a side elevation,

Figure 2 a plan, and

Figure 3 a front elevation of a view finder of the pivotal type, fitted with the non-automatic indicator.

Figure 4 is a front elevation, and

Figure 5 a plan of a view finder of the rotating type fitted with an automatic indicator.

Figure 6 is a side elevation of the front portion of a camera showing the means for the automatic operation of the indicator.

In the form shown in Figures 1 to 3, A represents the view finder. B is the indicator bar that is laid across the top surface of the finder so that it extends laterally across it from side to side. This bar (which may be a fine stiff rod of any approved material) at each end, is secured to an arm C that extends down the corresponding side face of the finder and has its lower end turned into a slot D formed to extend vertically in that side of the finder's casing. The slots on both sides are made coincident and the arms C of equal length so that by moving the ends of the arms down and up in the slots, the indicator bar will be moved forward and rearward across the top glass of the finder to provide for it being worked in the manner described. The different positions of the bar on the finder at which it corresponds with the actual distances of the subject are indicated by scale markings on the outside face of the finder disposed either in relation to the to and fro movements of the bar or to the up and down movements of the arm ends, as shown in Figure 1. These markings may, however, be disposed in any other convenient position on the finder.

This construction of indicator being entirely mounted and controlled upon the finder will not interfere with the finder being turned over to allow for the camera being used on its side, and when in this position, the bar may be just as readily controlled.

The indicator thus made may be worked in conjunction with the movements of the lens carrier as it moves in and out to its different focal positions, by linking it up therewith, through any suitable and approved mechanism. This mechanism may be varied in a number of ways to suit different circumstances and constructions of cameras and in themselves, form no feature of this invention.

The form of automatically controlled indicator shown in Figures 4 to 6 is an illustration of a suitable manner of effecting this object. According to this form, the bar B extends across the finder top and is attached to suitable side wings B' running in horizontal guide slots D formed in the finder sides so that the bar may move freely and retain its position parallel to the front and rear edges of the finder. The bar is combined with a rack E fitting on the corner of the finder so that it extends loosely alongside the finder on the outside and also along the top of the finder above one edge thereof. This rack is adapted to move with the said bar, the portion on the side being provided for operating the bar when the camera is in the vertical position, and the portion on the top being used when the camera is on its side and the finder turned round in the usual way.

The front of the camera F, as shown in Figure 6, carries a vertical spindle G journalled in suitable bearings to rotate freely. This spindle moves with the camera front as it is moved in and out in the focusing operations. At its upper end it is provided with a small pinion H that is adapted to gear with the teeth of either portion of the rack E, and at its lower end it is provided with a pinion J fixed thereon, which is disposed to gear upon the inside of a rack bar K fixed along the edge of the camera bed. This rack bar K is so disposed that it commences to engage with the pinion when the camera front is moved out to the "infinity" position and continues its engagement to the minimum focal distance position of the camera front's movements. The bar B and its rack E are disposed so that the pinion J holds the bar normally at the point in its movement at which it indicates "infinity", so that as the camera front is moved out and the spindle is caused to rotate, on the front passing "infinity" position, the bar B is moved back across the finder in correspondence with the outward movements of the camera front. The relative amounts of movement in the bar B and the camera front may not be the same in changing from point to point, but the ratio of movement is, so that by properly proportioning the pinions H and J, the correct movements of the indicator bar will be ensured.

In this arrangement, the pinion H may impede the rotating of the finder and the positioning of the finder on its side will vary the distance between the camera bed and the top portion of the rack as compared with the side portion thereof. To provide for the pinion H being automatically moved while the finder is being turned, to allow for it being arranged in gear with either portion of the rack E, the top end of the spindle G is made telescopic so that such end and the pinion attached may slide up and down at will and is also formed with a spring knuckle joint $g$ in it that will allow of it bending out at its top. The rack is made with a flange E' along each of its outer edges which will engage the pinion on its respective sides as the finder is turned around and will push the top end of the spindle down or draw it out to keep the pinion in engagement with the rack. The knuckle joint *g* will permit of the spindle bending to allow the finder's corner to pass. This provision will also allow of the appliance being adjusted in relation to a rising and falling front camera construction.

The principle of adjustment and focusing embodied in this invention is based upon the camera being held level at a given height, or normal height from the ground. This may be standardized in practice for universal use to suit the average height at which the camera is held by people of normal height, which will then be suitable for the great majority of people. The standard height being fixed, a user of below the normal height will merely require to raise the camera to the standard or normal height, while one above the normal height would require to lower it.

The principle of construction and operation hereinbefore described can with equal effectiveness be applied to a direct vision finder camera of the focal plane type, which is focused by a rotation of the lens to move it in or out. These have their finders made to extend in the vertical plane of the lens or plate. The sighting bar then moves up and down above the lens and over the face of the finder or in cases where the finder is erected near the plane of the plate, somewhat in front thereof.

I claim:—

1. In a focusing attachment for cameras, a finder having a vision glass in one wall, and an indicator bar mounted with relation to the finder to extend laterally across said glass at right angles to the vertical line of the image shown therein of the object to be photographed; said bar adapted to be moved forward and backward across said glass in the said vertical line of the image while maintaining such lateral position, and indicating the correct focus for said object when it touches the foot of the image and the camera is held level.

2. In a focusing attachment for cameras, a finder having a vision glass in one wall, and an indicator bar mounted to extend laterally over the finder and across said glass at right angles to the vertical line of the image shown therein of the object to be photographed; said bar adapted to be moved forward and backward over said glass in the said vertical line of the image while maintaining such lateral position, and indicating the correct focus for said object when it touches the foot of the image and the camera is held level.

3. In a focusing attachment for cameras, a finder having a vision glass in its top wall and coincident slots in its opposite side walls, and an indicator bar disposed laterally across said glass at right angles to the vertical line of the image shown therein of the object to be photographed and having laterally-bent end portions provided with terminals which project freely into said slots; said bar adapted to be moved forward and backward over said glass in the said vertical line of the image while maintaining such lateral position, and indicating the correct focus for said object when it touches the foot of the image and the camera is held level.

4. In a folding camera, the combination, with the movable lens, of a focusing attachment comprising a finder connected to move forward and backward bodily with the lens and having a vision glass in one wall, an indicator bar mounted with relation to the finder to extend laterally across said glass at right angles to the vertical line of the image shown therein of the object to be photographed; said bar being movable forward and backward across said glass in the said vertical line of the image while maintaining such lateral position, and indicating the correct focus for said object when it touches the foot of the image and the camera is held level, and means for effecting the movements of said bar automatically during and consequent upon the movements of the lens.

5. In a folding camera, the combination, with the movable lens, of a focusing attachment comprising a finder connected to move forward and backward bodily with the lens and having a vision glass in one wall, an indicator bar mounted to extend laterally over the finder and across said glass at right angles to the vertical line of the image shown therein of the object to be photographed; said bar being movable forward and backward over said glass in the said vertical line of the image while maintaining such lateral position, and indicating the correct focus for said object when it touches the foot of the image and the camera is held level, and means for effecting the movements of said bar automatically during and consequent upon the movements of the lens.

6. In a folding camera, the combination, with the movable lens, of a focusing attachment comprising a finder connected to move forward and backward bodily with the lens and having a vision glass in one wall, an indicator bar mounted on the finder to extend laterally across said glass at right angles to the vertical line of the image shown therein of the object to be photographed; said bar being movable forward and backward over said glass in the said vertical line of the image while maintaining such lateral position, and indicating the correct focus for said object when it touches the foot of the image and the camera is held level; a gear element connected to said bar, a gear element connected to the camera bed, and a gear train leading from the second gear element to the first one and operated automatically during and consequent upon the movements of the lens for effecting the movements of the bar.

7. A folding camera according to claim 6, in which the gearing comprises two racks, one fixed to the indicator bar and the other to the camera bed, a vertical spindle journaled in bearings carried by the movable front of the camera adjacent the lens, and pinions fixed to the opposite ends of the spindle and meshing with the two racks; substantially as described.

In testimony whereof, I affix my signature.

JOSEPH PATRICK CARMINE.